(12) United States Patent
Masini et al.

(10) Patent No.: US 9,797,439 B2
(45) Date of Patent: Oct. 24, 2017

(54) HINGE FOR COMPOSITE MATERIALS AND PROCESS FOR ITS MANUFACTURE

(75) Inventors: Attilio Masini, Monteveglio BO (IT); Nicolo Pasini, Taino VA (IT); Luigi De Sario, Crevalcore BO (IT)

(73) Assignee: AUTOMOBILI LAMBORGHINI S.P.A., Sant' Agata Bolognese Bo (IT)

( * ) Notice: Subject to any disclaimer, the term of this patent is extended or adjusted under 35 U.S.C. 154(b) by 229 days.

(21) Appl. No.: 13/817,271

(22) PCT Filed: Sep. 7, 2011

(86) PCT No.: PCT/IB2011/053908
§ 371 (c)(1),
(2), (4) Date: Sep. 11, 2013

(87) PCT Pub. No.: WO2012/035465
PCT Pub. Date: Mar. 22, 2012

(65) Prior Publication Data
US 2014/0007377 A1    Jan. 9, 2014

(30) Foreign Application Priority Data

Sep. 17, 2010   (IT) ............................... MI2010A1693

(51) Int. Cl.
| | |
|---|---|
| *B32B 3/10* | (2006.01) |
| *B32B 3/14* | (2006.01) |
| *B32B 3/16* | (2006.01) |
| *B32B 3/18* | (2006.01) |
| *B32B 5/22* | (2006.01) |
| *B32B 5/26* | (2006.01) |

(Continued)

(52) U.S. Cl.
CPC ................ *F16C 11/12* (2013.01); *E05D 1/00* (2013.01); *E05Y 2800/68* (2013.01); *Y10T 16/525* (2015.01)

(58) Field of Classification Search
CPC ... F16C 11/12; B32B 3/10; B32B 3/16; B32B 3/18; B32B 5/22; B32B 5/26; B32B 5/28; E05D 1/00; E05D 1/02; E05Y 2800/68; E05Y 2900/20; B29C 70/42; B29C 70/68; B29C 70/687
USPC .......... 428/172, 189, 200; 16/225, 234, 372, 16/250; 264/258
See application file for complete search history.

(56) References Cited

U.S. PATENT DOCUMENTS 3,391,053 A * 7/1968 Kolb .................... C03C 17/322
                                                                 427/386
3,445,052 A    5/1969 Lewallen
(Continued)

FOREIGN PATENT DOCUMENTS

DE           3609413 A1    10/1987
DE         20120819 U1     4/2002
(Continued)

*Primary Examiner* — Joanna Pleszczynska
(74) *Attorney, Agent, or Firm* — Lucas & Mercanti, LLP

(57) ABSTRACT

A hinge is disclosed having at least two groups of layers of fibers arranged on and/or under two opposite edges, respectively, of at least one substrate of a material flexible and compatible for the adhesion with resins for composite materials, so that a central portion of the substrate is not covered by these layers, the substrate and the layers being incorporated in a cured and flexible resin. The present invention also relates to a process for manufacturing said hinge.

20 Claims, 2 Drawing Sheets

(51) Int. Cl.
*B32B 5/28* (2006.01)
*E05D 1/00* (2006.01)
*E05D 5/00* (2006.01)
*E05D 7/00* (2006.01)
*F16C 11/12* (2006.01)

(56) References Cited

U.S. PATENT DOCUMENTS

| | | | | |
|---|---|---|---|---|
| 5,463,794 | A * | 11/1995 | Erland | 16/225 |
| 6,474,945 | B1 * | 11/2002 | Nakasato | B64C 27/615 29/889.7 |
| 2007/0000091 | A1 * | 1/2007 | Priegelmeir et al. | 16/372 |
| 2008/0237068 | A1 * | 10/2008 | Melamed | 206/5 |
| 2010/0162942 | A1 * | 7/2010 | Karow et al. | 116/63 P |
| 2010/0163684 | A1 * | 7/2010 | Dando et al. | 244/172.6 |

FOREIGN PATENT DOCUMENTS

| | | |
|---|---|---|
| EP | 1738895 A1 | 1/2007 |
| JP | 2001-271548 A | 10/2001 |

* cited by examiner

HINGE FOR COMPOSITE MATERIALS AND PROCESS FOR ITS MANUFACTURE

CROSS-REFERENCE TO RELATED APPLICATIONS

This application is a 371 of PCT/IB2011/053908, filed Sep. 7, 2011, which claims the benefit of Italian Patent Application No. MI2010A001693, filed Sep. 17, 2010, the contents of each of which are incorporated herein by reference.

FIELD OF THE INVENTION

The present invention relates to a hinge for composite materials, in particular a hinge which can be fastened or integrated in two composite material parts which must be mutually connected in a rotatable manner. The present invention also relates to a process for manufacturing said hinge.

BACKGROUND OF THE INVENTION

Known hinges for composite material parts comprise two metal plates pivoted to each other and provided with holes for the fastening by means of bolts or other threaded member to the parts to be mutually connected. The holes for said known hinges are relatively difficult to be made in the composite material parts and in any case they may cause a structural weakening of these parts, due to the particular physical features of the composite materials. Said known hinges are also relatively difficult to be fastened with adhesives to the composite material parts due to the different physical and chemical features of the materials to be glued.

EP 1738895 discloses a hinge comprising two groups of layers of carbon fibers impregnated with epoxy resin, which layers are arranged on and under a substrate of aramid fibers impregnated with a polyurethane resin. The layers and the substrate are cured together without injection of resins, after which a groove with a V- or U-shaped cross-section is made on both layers, so that a central portion of the substrate is not covered by said layers and forms thus a line of inflection.

However, said known hinge is complex and expensive to be manufactured, since it requires layers of pre-impregnated fibers, known also with the name of pre-preg, which are more expensive than the dry fibers. Furthermore, the outer layers, being more rigid when cured, require a precise mechanic working for making the grooves, which must be perfectly parallel to allow a correct inflection. Said mechanic working, besides increasing manufacture costs and times, also involves the risk of damages of the substrate, since the whole thickness of the rigid layers must be removed, however without leaving the substrate surfaces uncovered. In order to reduce said risk, EP 1738895 explains that the grooves with a V-shaped cross-section are preferable, however these grooves allow only inflections with angles smaller or equal to the summit angle of the groove, thus they cannot be employed in hinges which must rotate with angles greater than 180°. Due to the grooves, the substrate is much thinner than the whole hinge, with the consequent risk of breakings along the line of inflection. On the other hand, the substrate, due to its chemical-physical composition, would be too rigid if it was more or less thick like the rest of the hinge.

The use of different resins for the layers and the substrate further involves adhesion problems which EP 1738895 suggests to decrease through an additional working which roughens the substrate.

Said known hinge is also relatively expensive and delicate due to the aramid and/or woven fibers employed for the substrate. In order to decrease the latter drawbacks EP 1738895 suggests to employ substrates made up of several layers of fibers crossed and/or perpendicular to the line of inflection, with a consequent increase of the manufacture costs. In general, EP 1738895 suggests to employ substrates and layers with fibers similar to each other, wherein the difference of rigidity of the substrate with respect to the layers mainly depends upon the different resins impregnating the layers and the substrate.

SUMMARY OF THE INVENTION

It is therefore an object of the present invention to provide a hinge, which is free from said disadvantages. Said object is achieved with a hinge and a manufacture process, whose main features are disclosed in claims 1 and 7, respectively, while other features are disclosed in the remaining claims.

Thanks to its particular physical and chemical features, the hinge according to the present invention not only can be easily fastened to composite material parts also by means of adhesives or other known systems for mutually joining composite material members, but it can also be easily incorporated in these parts in RTM (Resin Transfer Molding), Light-RTM, VARTM (Vacuum Assisted Resin Transfer Molding) processes and/or in the process disclosed in the Italian patent application MI2010A001072.

Furthermore, thanks to the particular manufacture process, at the end of which both the substrate and the layers are incorporated in a cured and flexible resin, the hinge can be produced in a simple, fast and economic manner, so that it can be employed for various applications, not only for mutually connecting two members and not necessarily for connecting two members made of a composite material. For example, the hinge can be produced with such sizes and shapes as to be employed in itself as a folder.

The hinge according to the present invention can easily absorb tolerances of arrangement, since it is not provided with a pin and thus the position of the axis of rotation can be adapted to the relative position of the parts to be rotated. Furthermore, thanks to its reduced thickness, the hinge does not cause markings in A-class components (varnished or of unvarnished carbon) if it is glued to the latter.

The hinge has also a pleasant aesthetic aspect, especially if an outer layer is made of natural leather, microfiber and/or of a material with fibers substantially parallel to the axis of rotation, so as to avoid that this layer is damaged by the rotation of the hinge.

The hinge according to the present invention is particularly wear resistant, above all when using a special resin having a Young's modulus comprised between 2.8 and 6.5 MPa, an ultimate tensile strength comprised between 0.7 and 1.3 MPa and/or an elongation at break comprised between 21 and 39%.

BRIEF DESCRIPTION OF THE DRAWINGS

Further advantages and features of the hinge and the process according to the present invention will become clear to those skilled in the art from the following detailed and non-limiting description of some embodiments thereof with reference to the attached drawings, wherein.

DETAILED DESCRIPTION OF THE INVENTION

Figure 1:
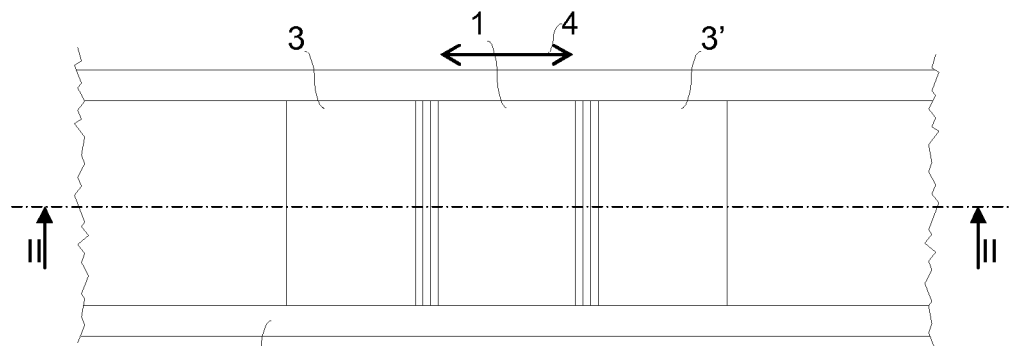
FIG. 1 shows a top view of a first embodiment of the hinge during a first operative step of the process.
Figure 2:
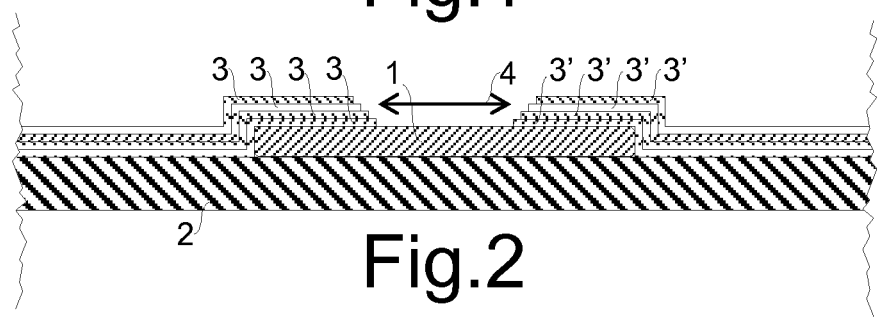
FIG. 2 shows section II-II of FIG. 1.

Referring to FIGS. 1 and 2, it is seen that in a first operative step of the process at least one substrate 1, in particular rectangular, of a material flexible and compatible for the adhesion with resins for composite materials, in particular microfiber or natural leather preferably chamois leather, is arranged on a functional surface of a mould 2 for composite materials. The average thickness of substrate 1 is comprised between 1 and 4.5 mm. At least two groups of fiber layers 3, 3', in particular carbon fibers, are arranged one on the other on two opposite edges of substrate 1, so that a central portion 4 of substrate 1 is not covered by layers 3, 3'. The fibers of layers 3,3' are preferably dry, namely coupled with a quantity of resin from 0 to 10%, preferably to 5%, in weight. The average width of the central portion 4 of substrate 1 is preferably comprised between 1 and 25 mm, in particular it is a fraction comprised between 2.5% and 30% of the average width of substrate 1. The width of the portion covered by layers 3 or 3' of the edge of substrate 1 is preferably comprised between 5 and 40 mm. Layers 3 or 3' of either group are four layers of TW (Twill Weave) 2×2 fibers, basis weight 200 g/m², arranged one on the other with orientations substantially perpendicular to each other in the adjacent layers. In an alternative embodiment the two groups of fiber layers can be arranged one on the other under the two opposite edges of the substrate.

Figure 3:
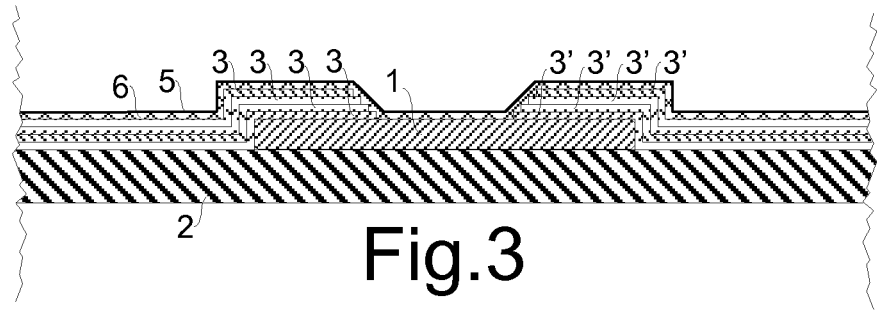
FIG. 3 shows the hinge of FIG. 2 during a second operative step of the process.

FIG. 3 shows a second operative step, in which substrate 1 and layers 3, 3' are covered by an impregnable and removable protective sheet, by a net for infusions made of a plastic material and by a vacuum bag 5, after which the whole is heated up to about 60° C., vacuum, namely a pressure not higher than 0.01 bar, is created between the vacuum bag 5 and mould 2 and resin 6 at about 60° C., covering substrate 1 and layers 3, 3', is injected and/or drawn by depression into this interspace. The whole is further heated up to about 90° C. at ⅔° C. per minute, then left at about 90° C. for at least one hour and at last cooled down to room temperature.

Figure 4:
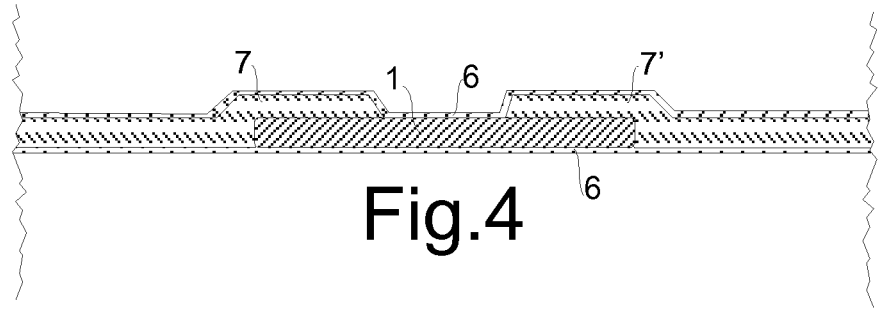
FIG. 4 shows the hinge of FIG. 2 at the end of the process.

FIG. 4 shows the finished hinge, after it has been extracted from the vacuum bag 5, separated from mould 2, from the protective sheet and from the net for infusions, as well as trimmed along the edges. The finished hinge comprises substrate 1 and fiber layers 3, 3' mutually joined in two groups 7, 7' incorporated in resin 6. Resin 6, once cured, is flexible and has a Young's modulus comprised between 2.8 and 6.5 MPa, an ultimate tensile strength comprised between 0.7 and 1.3 MPa and/or an elongation at break comprised between 21 and 39%. For this purpose, resin LME 10184/10185 of Huntsman Advanced Materials turned out to be particularly effective.

Figure 5:
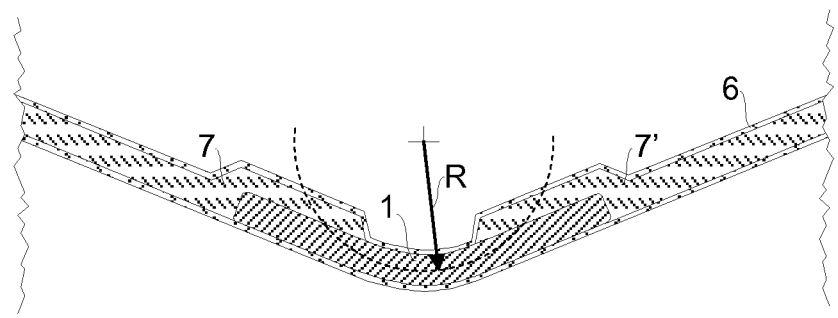
FIG. 5 shows the hinge of FIG. 4 during use.

Referring to FIG. 5, it is seen that substrate 1 of the hinge according to the present invention, when the hinge is bent, has a curvature radius R greater than 4.5% of the average width of the central portion 4 of substrate 1 when the hinge is not bent. The curvature radius R, when the hinge is bent, is greater than 2 mm.

Figure 6:
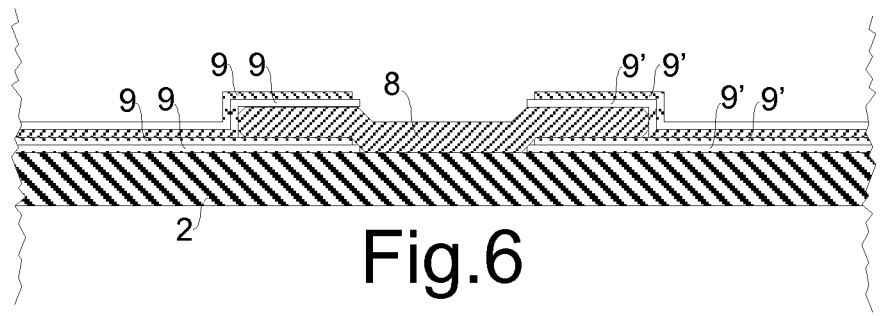
FIG. 6 shows a sectioned view of a second embodiment of the hinge during the first operative step of the process.

FIG. 6 shows a second embodiment of the hinge, similar to the first embodiment, in which one or both opposite edges of substrate 8 are comprised between fibers layers 9, 9', in particular two fibers layers 9 or 9' with orientations substantially perpendicular to each other in the adjacent layers on either side of an edge of substrate 8.

Figure 7:
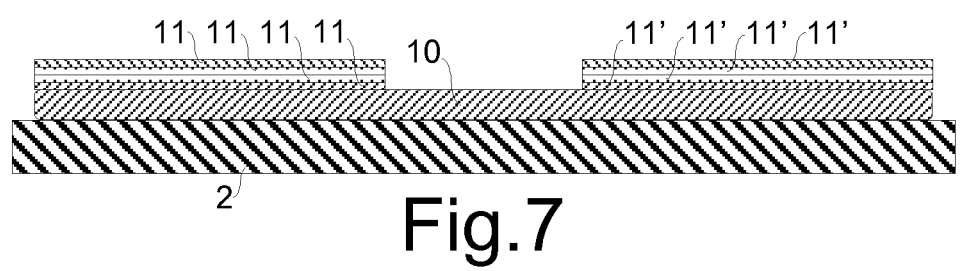
FIG. 7 shows a sectioned view of a third embodiment of the hinge during the first operative step of the process.

FIG. 7 shows a third embodiment of the hinge, always similar to the first embodiment, in which substrate 10 extends in length at least for the whole extension of fiber layers 11, 11', so that the latter cannot contact mould 2.

Figure 8:
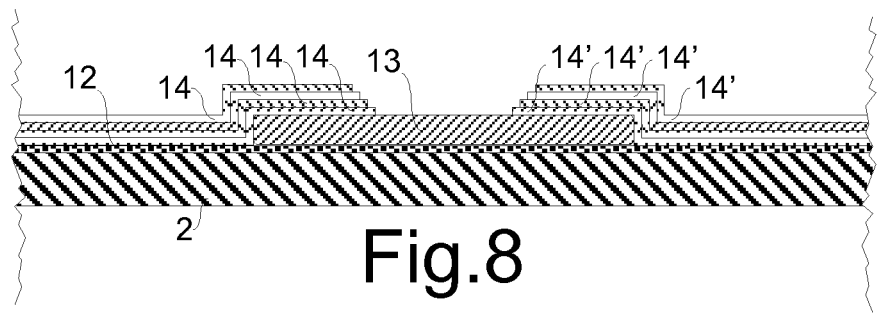
FIG. 8 shows a sectioned view of a fourth embodiment of the hinge during the first operative step of the process.

FIG. 8 shows a fourth embodiment of the hinge, always similar to the first embodiment, in which an additional layer 12 of fibers substantially parallel to the axis of rotation of the hinge covers at least partially one side of substrate 13 and one side of the first layers of the two groups of fiber layers 14, 14', so that the additional layer 12 is comprised both between substrate 13 and layer 2 and between the first fiber layers 14, 14' and mould 2. The fibers of the additional layer 12 are substantially parallel to the edges of substrate 13 covered by fibers 14, 14'. In other embodiments, the additional layer 12 can be arranged on the side of substrate 13 opposite to mould 2 and/or between two fiber layers of the groups of layers 14, 14'.

The manufacture process of the hinge according to the second, third and fourth embodiment is then substantially the same as the manufacture process of the first embodiment. Anyway, other resin molding processes can be employed in alternative embodiments, for example by using further moulds and resin injected according to RTM (Resin Transfer Molding), Light-RTM, VARTM (Vacuum Assisted Resin Transfer Molding) processes and/or in the process disclosed in the Italian patent application MI2010A001072.

Possible modifications and/or additions may be made by those skilled in the art to the hereinabove disclosed and illustrated embodiments while remaining within the scope of the following claims. In particular, further embodiments of the invention may comprise the technical features of one of the following claims with the addition of one or more technical features, taken singularly or in any mutual combination, disclosed in the text and/or illustrated in the drawings.

The invention claimed is:

1. A hinge comprising:
    a substrate of a flexible material being compatible for adhesion with resins for composite materials, the substrate having opposite edges with a first surface and a second surface extending between the opposite edges; and
    at least two groups of fiber layers disposed on or under the first surface and on or under the second surface, or both on the first surface and under the second surface of the substrate, the fiber layers overlapping the opposite edges of the substrate and extending towards a central portion of the substrate where the central portion of the substrate is not covered by the fiber layers;
    wherein the substrate, the central portion not covered by the fiber layers, and the fiber layers are impregnated with a cured resin thereby providing the substrate, the central portion, and the fiber layers with a continuous and flexible exterior coating of the same cured resin extending along the substrate, the central portion and the fiber layers.

2. The hinge according to claim 1, wherein the average width of the central portion of the substrate is between 1 and 25 mm.

3. The hinge according to claim 1, wherein the average width of the central portion of the substrate is a fraction between 2.5% and 30% of the average width of the substrate.

4. The hinge according to claim 1, wherein the width of the portion of the edge of the substrate covered by the layers is between 5 and 40 mm.

5. The hinge according to claim 1, wherein, when bent, has a curvature radius (R) greater than 4.5% of the average width of the central portion of the substrate when the hinge is not bent.

6. The hinge according to claim 1, wherein, when it is bent, has a curvature radius (R) greater than 2 mm.

7. The hinge according to claim 1, wherein the resin, when cured, has a Young's modulus between 2.8 and 6.5 MPa or an ultimate tensile strength between 0.7 and 1.3 MPa and has an elongation at break between 21 and 39%.

8. The hinge according to claim 1, wherein the fiber layers include a quantity of resin from 0 to 10% in weight.

9. The hinge according to claim 1, wherein the substrate extends in width at least for the whole extension of the fiber layers.

10. The hinge according to claim 1, wherein an additional layer of fibers covers at least partially one side of the substrate, the fibers of the additional layer being substantially parallel to the rotation axis of the hinge or to the edges of the substrate covered by the fibers.

11. The hinge according to claim 1, wherein the substrate is made of microfiber.

12. The hinge according to claim 1, wherein the substrate is made of natural leather.

13. The hinge according to claim 8, wherein said fibers are carbon fibers.

14. Process for manufacturing hinges, comprising:
arranging on a functional surface of a mold a substrate of a flexible material being compatible for adhesion with resins for composite materials, the substrate having opposite edges with a first surface and a second surface extending between the opposite edges, and at least two groups of fiber layers disposed on or under the first surface and on or under the second surface, or both on the first surface and under the second surface of the substrate, or any combination thereof, the fiber layers overlapping the opposite edges of the substrate and extending towards a central portion of the substrate where the central portion of the substrate is not covered by the fiber layers;

injecting or drawing by depression into the mold, a resin which is flexible when cured, so as to impregnate the substrate the central portion not covered by the fiber layers and the fiber layers with the resin; and curing the resin to provide a continuous and flexible exterior coating of the cured resin extending along the substrate, the central portion and the fiber layers.

15. The process according to claim 14, wherein the resin, when cured, has a Young's modulus between 2.8 and 6.5 MPa or an ultimate tensile strength between 0.7 and 1.3 MPa and has an elongation at break between 21 and 39%.

16. The process according to claim 14, wherein the fiber layers include a quantity of resin from 0 to 10% in weight.

17. The process according to claim 14, wherein the substrate extends in width at least for the whole extension of the fiber layers.

18. The process according to claim 14, wherein an additional layer of fibers covers at least partially one side of the substrate, the fibers of the additional layer being substantially parallel to the rotation axis of the hinge or to the edges of the substrate covered by the fibers.

19. The process according to claim 14, wherein the substrate is made of microfiber.

20. The process according to claim 14, wherein the substrate is made of natural leather.

* * * * *